(12) United States Patent  (10) Patent No.: US 8,179,400 B2
Kwisthout  (45) Date of Patent: May 15, 2012

(54) MOTION ADAPTIVE AMBIENT LIGHTING

(75) Inventor: Cornelis Wilhelmus Kwisthout, Breda (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 922 days.

(21) Appl. No.: 12/280,175

(22) PCT Filed: Feb. 26, 2007

(86) PCT No.: PCT/IB2007/050615
§ 371 (c)(1),
(2), (4) Date: Sep. 5, 2008

(87) PCT Pub. No.: WO2007/099494
PCT Pub. Date: Sep. 7, 2007

(65) Prior Publication Data
US 2009/0243515 A1  Oct. 1, 2009

Related U.S. Application Data

(60) Provisional application No. 60/777,839, filed on Mar. 1, 2006, provisional application No. 60/749,802, filed on Dec. 13, 2005.

(51) Int. Cl.
G09G 5/00 (2006.01)
G06T 7/20 (2006.01)
H04N 9/73 (2006.01)
H04N 5/58 (2006.01)
H05B 37/02 (2006.01)
G06K 9/40 (2006.01)
G06K 9/32 (2006.01)

(52) U.S. Cl. ........ 345/589; 345/426; 345/428; 345/581; 345/77; 348/699; 348/227.1; 348/416; 348/602; 382/236; 382/253; 382/254; 382/274

(58) Field of Classification Search ................. 345/426, 345/428, 581, 589, 6, 90, 77, 101; 348/154–155, 348/208.13, 227.1, 402.1, 687, 413–416, 348/431, 602, 699–700; 382/162, 232, 236, 382/253, 254, 274
See application file for complete search history.

(56) References Cited

U.S. PATENT DOCUMENTS 5,615,018 A    3/1997  Wu et al.
5,907,353 A *  5/1999  Okauchi ................. 348/218.1
(Continued)

FOREIGN PATENT DOCUMENTS
EP    1600871 A1   11/2005
(Continued)

*Primary Examiner* — Wesner Sajous

(57) ABSTRACT

A method for controlling an ambient lighting element including receiving a content signal, analyzing the content signal to determine a motion vector of an object (120A) depicted in the content signal, presenting the content signal on a display device, and adjusting an ambient lighting effect provided by the ambient lighting element as determined by the motion vector The presented content signal may be portioned into macro-blocks (110A) and sub-blocks (230). A motion vector of each sub-block (230) may be resolved into components that are parallel and perpendicular to an outside edge of the display device. An average color of each sub-block (230) depicted within a macro-block (110A) in proximity to an outside edge of the display device may be weighted by the motion vector of the corresponding sub-block (230) for determining an average color of the macro-block (110A). The average color of the macro-block (110A) may be used to adjust the ambient lighting element.

14 Claims, 4 Drawing Sheets

U.S. PATENT DOCUMENTS

| | | | |
|---|---|---|---|
| 6,084,641 A * | 7/2000 | Wu | 348/722 |
| 2003/0057884 A1 | 3/2003 | Dowling et al. | |
| 2004/0027369 A1 * | 2/2004 | Kellock et al. | 345/716 |
| 2006/0053459 A1 * | 3/2006 | Simerly et al. | 725/105 |
| 2006/0285010 A1 * | 12/2006 | Wang et al. | 348/452 |
| 2007/0035707 A1 * | 2/2007 | Margulis | 353/122 |
| 2007/0183673 A1 * | 8/2007 | Mietens | 382/236 |
| 2008/0036908 A1 * | 2/2008 | Wong et al. | 348/448 |

FOREIGN PATENT DOCUMENTS

| | | |
|---|---|---|
| JP | 6076958 A | 3/1994 |
| WO | 2003101098 A1 | 12/2003 |
| WO | 20-040065578 A2 | 1/2004 |
| WO | 2004006570 A1 | 1/2004 |
| WO | 2006003604 A1 | 1/2006 |

* cited by examiner

MOTION ADAPTIVE AMBIENT LIGHTING

The application is based upon and claims the benefit of priority from prior U.S. Provisional Patent Application No. 60/749,802 filed on Dec. 13, 2005, the entire contents of which are incorporated herein by reference.

The present system relates to video display units having ambient lighting effects wherein ambient light characteristics are adapted by motion of elements of displayed content.

Koninklijke Philips Electronics N.V. (Philips) and other companies have disclosed means for changing ambient or peripheral lighting to enhance video content for typical home or business applications. Ambient lighting added to a video display or television has been shown to reduce viewer fatigue and improve realism and depth of experience. Currently, Philips has a line of televisions, including flat panel televisions with ambient lighting, where a frame around the television includes ambient light sources that project ambient light on the back wall that supports or is near the television. Further, light sources separate from the television may also be controlled to produce ambient light that may be similarly controlled.

PCT Patent Application WO 2004/006570 incorporated herein by reference as if set out in entirety, discloses a system and device for controlling ambient lighting effects based on color characteristics of displayed content, such as hue, saturation, brightness, colors, speed of scene changes, recognized characters, detected mood, etc. In operation, the system analyzes received content and may utilize the distribution of the content, such as average color, over the entire display or utilize the portions of the displayed content that are positioned near the border of the display to control ambient lighting elements. The ambient light feature generally uses the video content of the display itself to generate the ambient lighting effects on a per frame basis together with temporal averaging to smooth out temporal transitions of the ambient lighting elements.

It is an object of the present system to overcome disadvantages in the prior art and improve on the ambient lighting effect to facilitate a more immersive viewing experience.

The present system provides a method and device for controlling an ambient lighting element. The method includes receiving a content signal, analyzing the content signal to determine a motion vector of an object depicted in the content signal, presenting the content signal on a display device, and adjusting an ambient lighting effect provided by the ambient lighting element, wherein the adjusting is determined by the motion vector. In accordance with an embodiment, analyzing the content may include analyzing a portion of the content signal that is depicted positioned in proximity to an outside edge of the display device.

In a further embodiment, the presented content signal may be divided into macro-blocks. The motion vector may be determined by analyzing a macro-block depicted in proximity to an outside edge of the display device. Further, the motion vector may be resolved into components that are parallel and perpendicular to an outside edge of the display device. The adjusting of the ambient lighting effect may be determined by the perpendicular component of the motion vector. In a case wherein the content signal is provided by temporal content portions, a given temporal content portion may be utilized to adjust the ambient lighting effect provided during a preceding or proceeding temporal content portion. In accordance with the present system, a luminance, color saturation, and/or other characteristic of the ambient lighting effect may be adjusted by the motion vector.

In yet a further embodiment, analyzing the content signal may include portioning the presented content signal into macro-blocks and sub-blocks, determining a color characteristic (e.g., average color) of each sub-block, determining a motion vector of each sub-block, weighting the determined color characteristic of each sub-block by the corresponding motion vector, and determining a color characteristic of a macro-block by the weighted determined color characteristic of corresponding sub-blocks. The ambient lighting effect may be determined by the determined color characteristic (e.g., average color) of the macro-block.

The presented content signal may be portioned into macro-blocks and sub-blocks. A motion vector of each sub-block may be resolved into components that are parallel and perpendicular to an outside edge of the display device. An average color of each sub-block depicted within a macro-block in proximity to an outside edge of the display device may be weighted by the motion vector of the corresponding sub-block for determining an average color of the macro-block. The average color of the macro-block may be utilized to adjust the ambient lighting element.

The following are descriptions of illustrative embodiments that when taken in conjunction with the following drawings will demonstrate the above noted features and advantages, as well as further ones. In the following description, for purposes of explanation rather than limitation, specific details are set forth such as the particular architecture, interfaces, techniques, etc., for illustration. However, it will be apparent to those of ordinary skill in the art that other embodiments that depart from these specific details would still be understood to be within the scope of the appended claims. Moreover, for the purpose of clarity, detailed descriptions of well-known devices, circuits, and methods are omitted so as not to obscure the description of the present system.

It should be expressly understood that the drawings are included for illustrative purposes and do not represent the scope of the present system. In the accompanying drawings, like reference numbers in different drawings designate similar elements.

Figure 1A:
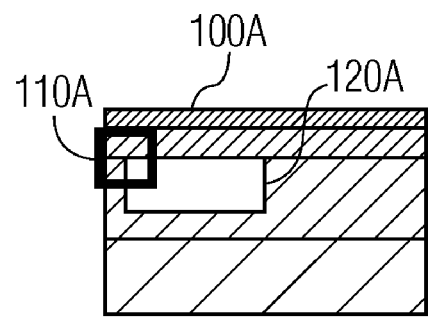
FIGS. 1A, 1B, 1C show three consecutive frames of content analyzed according to an illustrative embodiment of the present system.
Figure 1B:
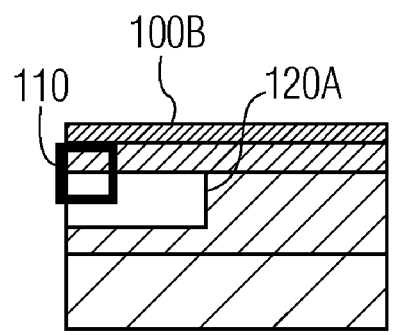
Figure 1C:
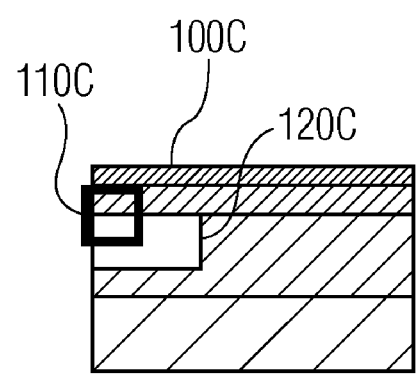

Referring to FIGS. 1A, 1B, 1C, there is shown three temporally consecutive frames 100A, 100B, 100C of content that may be displayed on a display device and that may be analyzed according to an illustrative embodiment of the present system. In the figures, frame 100A is depicted (e.g., displayed) temporally prior to frame 100B which is displayed temporally prior to frame 100C. The frames may be displayed on a display device, such as an LCD (Liquid Crystal Display) or PDP (Plasma Display Panel) flat television. However, the display device may be of any type and use any technology or platform, such as CRT (Cathode Ray Tube), FED (Field Emission Display), projection display, thin-film printed optically-active polymer display, or a display using any other technology or display type including a television. It is even applicable, for many embodiments, to any transmissive medium for the delivery of content, such as video content or visual content, such as found in a window of a building etc. For clarity of discussion, display device shall be used herein for illustrative purposes.

Within the content, a macro-block 110 is illustratively shown as a rectangular area that may be analyzed to generate and/or adjust an ambient lighting effect, such as a light spot, positioned to the left of the macro-block 110. A displayed object, illustratively an object 120, is shown moving towards the left of the frame 100 as the frames 100 progress (e.g., from frame 100A through to frame 100C). A portion of the object 120 is also shown progressing through the macro-block 110 as the frames 100 progress.

Figure 2A:
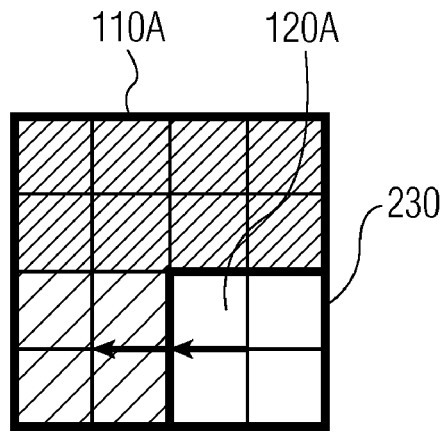
FIGS. 2A, 2B, 2C show an expanded view of a macro-block of FIG. 1 according to an illustrative embodiment of the present system.
Figure 2B:
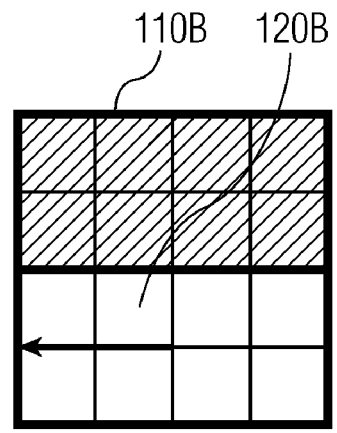
Figure 2C:
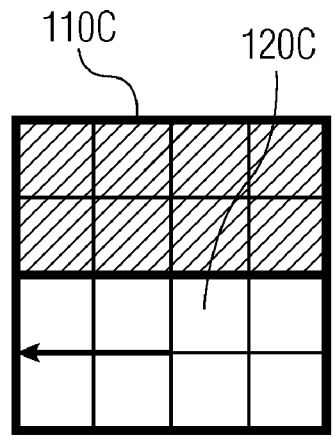

Referring now to FIGS. 2A, 2B, 2C, an expanded view of the macro-block 110 of FIG. 1 is shown according to an illustrative embodiment of the present system. The macro-block 110 is illustratively shown consisting of a group of 4×4pixels (16 pixels total). The object 120 contained within the macro-block 110 is shown moving to the left at a speed of 2 pixels per frame as the frames progress through frames 100A, 100B, 100C of FIG. 1. In one embodiment, motion information of the object (and/or motion information of the portion of the object progressing through the macro-block 110) may be derived from the content itself by examining the content on a frame by frame basis using techniques that would be readily apparent to a person skilled in the art. In an alternate embodiment, the motion information may be derived from motion information calculated for motion adaptive and/or motion compensated de-interlacing already utilized for some display devices (e.g., televisions) for de-interlacing interlaced content signals. The motion information may also be derived as a part of two-dimensional (2D) to three-dimensional (3D) conversion algorithms.

In a further embodiment, the motion information may be derived from MPEG (Moving Picture Experts Group) motion information that may be present in the stream of data that represents the content if the content is delivered as an MPEG compliant content stream. Typically an MPEG content stream is delivered to an MPEG decoder that may be present at the display device or a connected set-top box as is known in the art. For content that is represented as an MPEG data stream, frames may be divided into blocks (e.g., 8×8 blocks) and changes from one frame to a next frame may be represented as motion vectors indicating translations of blocks from one frame to the next frame. U.S. Pat. No. 5,615,018, incorporated herein by reference as if set out in entirety, discuses the system for deriving MPEG motion vectors for blocks within frames of content although the details are outside the focus of the current application.

Regardless of how the motion information is calculated or derived, in accordance with an embodiment of the present system, the motion information, for example, of objects within macro-blocks that border an outside perimeter of the frame, may be utilized to adjust an ambient lighting effect (e.g., luminance, color, hue, saturation, etc.). In addition, other ambient lighting effects may be adjusted such as adjusting the color of the ambient lighting effect itself may be adjusted. For example, in one embodiment, a lighting effect for all non relevant parts (e.g., not related to moving objects or related to moving objects as desired) may be blocked out to get a more "pure" color ambient lighting effect. In another embodiment, the speed with which the color changes may be adjusted in the ambient lighting effect. For example, parts of the ambient lighting effect that "display" moving objects may follow the input color quickly while others from the more static background may change color slowly (e.g., follow a color change) to emphasize the difference between motion and non-motion related effects. In another embodiment, the algorithm that is utilized to determine the color of the ambient lighting effect may vary depending on motion detected. For example, for a moving object, a peak detector algorithm may be utilized, while for the background, which still may consist of many different colors, an average color detector algorithm may be utilized to not emphasize just a single color of that background. Other adjustments to the ambient lighting effect would readily occur to a person of ordinary skill in the art and should be considered to be within the scope of the appended claims.

In any event, the ambient lighting effect may be produced by one or more ambient lighting elements (e.g., light spots) that are in the proximity (e.g., border, adjacent to, etc.) of given macro-blocks depicted on the display device. In this way, a further dimension is given to the ambient lighting effect which may lead to a more immersive viewing experience.

In accordance with an embodiment of the present system, motion information may be utilized on a per frame basis to adjust the ambient lighting effect. Illustratively and as discussed above, motion information may be calculated on a macro-block scale. In a case wherein motion information of the motion adaptive de-interlacing process is available and used, individual motion vectors contained within given macro-blocks may simply be added together to produce a resulting motion vector that is the sum of all motion vectors within the macro-block. In another embodiment, an average motion vector may be derived. For simplicity of the following discussion, a resulting motion vector will be discussed. It is intended that the term "resulting motion vector" be understood to encompass each of the above methods of deriving a motion vector and others that would occur to a person skilled in the art.

Illustratively, the resulting motion vector is split into a component parallel to the border between a screen edge adjoining the ambient lighting element that is to be adjusted (e.g., an AmbiLight™ spot) and the macro-block and a component perpendicular to this border. Illustratively, the component perpendicular to the border may be used for a motion adaptive ambient lighting element in accordance with the present system.

The perpendicular component of the motion vector may have three possible states. The perpendicular component of the motion vector may have a positive state, indicating that the resulting motion vector of the macro-block has a perpendicular component that indicates motion towards the border of the frame and the bordering ambient lighting element. In this case and in accordance with an embodiment of the present system, a previously determined ambient lighting result (e.g., the ambient lighting result determined by the system of PCT WO 2004/006570) is amplified (e.g., multiplied by a factor greater than one) by a motion factor that is determined by the perpendicular component of the resulting motion vector. The perpendicular component of the motion vector may have a negative state, indicating that the resulting motion vector of the macro-block has a perpendicular component that indicates motion away from the border of the frame and the bordering ambient lighting element. In this case and in accordance with an embodiment of the present system, a previously determined ambient lighting result is weakened (e.g., multiplied by a factor less than one) by a motion factor that is determined by the perpendicular component of the resulting motion vector. The perpendicular component of the motion vector may have a zero state, indicating that the resulting motion vector of the macro-block has a perpendicular component that indicates no motion either towards or away from the border of the frame and the bordering ambient lighting element. In this case and in accordance with an embodiment of the present system, a previously determined ambient lighting result is unchanged. In any event, after the normal ambient lighting effect, such as an average color effect, is adjusted using the motion factor as described above, the adjusted effect is applied to a corresponding ambient lighting element thereby emphasizing the movement of the object within the macro-block.

In a further embodiment, motion information may be utilized to control the way the average color on a macro-block scale is calculated, thereby adjusting a typical ambient lighting effect. In this embodiment, the motion information may be calculated on a sub-macro-block scale, referred to hereinafter as a sub-block scale. Illustratively, the sub-block size may be 2×2 pixels (and thus a 4×4 macro-block may consist of 4 sub-blocks). Such a sub-block of pixels is illustratively shown in FIG. 2A as sub-block 230. As would be readily appreciated, any size macro-block and sub-block may be readily utilized. In any event, typically, the size of the blocks that may be derived, such as may be available for motion adaptive de-interlacing, are smaller than the size of the macro-blocks used to drive a typical ambient lighting element, such as an AmbiLight™ spot. Accordingly, the sub-block motion information may already be available or be readily derived. In accordance with this embodiment, the motion vectors of the sub-blocks may be processed in the same way that the motion vector of the macro-block is processed in the discussion above. So as above, the component of the motion vector of the sub-blocks that is perpendicular to a border between the ambient lighting element and the macro-block may be derived and utilized, however in this embodiment the motion component is determined for each individual sub-block within the macro-block.

Prior to calculating the characteristic of the macro-block that is utilized to determine the ambient lighting element effect, such as an average color of the macro-block as illustratively discussed above, the average color of each sub-block is calculated. In other embodiments other characteristics of the macro-block and sub-blocks may be utilized. For simplicity, the term average color will be utilized herein although this term should be understood to encompass other macro-block and sub-block characteristics that may be utilized for determining an ambient lighting effect unless otherwise stated. Accordingly, it is intended that the term "average color" be understood to encompass each of the macro-block and sub-block characteristics and others (e.g., peak color, etc.) that would occur to a person skilled in the art unless specifically stated otherwise herein. In this embodiment, once the average color of the sub-blocks is determined, the motion information of the sub-blocks is used to weight the average color of those sub-blocks when calculating the average color of the macro-block. Similar to as discussed above, the perpendicular component of the sub-block's motion vector may have three potential states.

The perpendicular component of the motion vector of the sub-block may have a positive state, indicating that the resulting motion vector of the sub-block has a perpendicular component that indicates motion towards the border of the frame and the ambient lighting element that borders the corresponding macro-block. In this case and in accordance with an embodiment of the present system, a previously determined ambient lighting result (e.g., average color) for the sub-block is weighted (e.g., multiplied by a factor greater than one) by a motion factor that is determined by the perpendicular component of the resulting motion vector of the sub-block for the calculation of the average color of the macro-block. The perpendicular component of the motion vector of the sub-block may have a negative state, indicating that the resulting motion vector of the sub-block has a perpendicular component that indicates motion away from the border of the frame and the ambient lighting element that borders the corresponding macro-block. In this case and in accordance with an embodiment of the present system, the previously determined average color for the sub-block is weighted (e.g., multiplied by a factor less than one) by a motion factor that is determined by the perpendicular component of the resulting motion vector of the sub-block for the calculation of the average color of the macro-block.

The perpendicular component of the motion vector may have a zero state, indicating that the resulting motion vector of the sub-block has a perpendicular component that indicates no motion either towards or away from the border of the frame and the bordering ambient lighting element. In this case and in accordance with an embodiment of the present system, the average color of this sub-block is weighted with a factor=1 for the calculation of the average color of the macro-block.

The weights of the sub-blocks may be used to control several parameters of the averaging process, just as illustratively discussed for the macro-block motion vector determination. However, the present embodiment refines the result obtained when performing the motion vector calculation at the macro-block level because small moving objects within a macro-block may in some cases control the resulting ambient lighting effect more at the macro-block level than with the present sub-block calculation. For a case wherein the macro-block size becomes very small, which may be the case when there are numerous ambient lighting elements, the macro-block calculation and resulting ambient lighting effect will approach the sub-block calculation. This is due to the fact that in the case of small macro-blocks, the size of small macro-blocks may become smaller than the size of moving objects, so refinement (detail) within the macro-block, such as introduced by the use of sub-blocks, may add little or no refinement to the ambient lighting effect than the calculation and effect produced by the macro-block calculation.

A further embodiment that utilizes sub-locks may assign all moving objects a weight less than one. This results in an ambient lighting effect that is less dependent on moving objects. In this embodiment, weightings for positive and negative states may be scaled multiple ways such that a negative resulting motion vector results in a lower weighting than a positive resulting motion vector. The inverse of this would result in a positive resulting motion vector having a lower weighting than a negative resulting motion vector. In yet another variation, a positive and negative resulting motion vector may be normalized such that a given positive resulting motion vector would have a same result as a corresponding negative resulting motion vector. For example, a resulting +1 motion vector may have the same effect on the average color as a resulting −1 motion vector. In any event, this embodiment has an effect of calming down (e.g., smoothening) the effect in time since the ambient lighting effect will more closely follow the static portion of the content.

Another embodiment in accordance with the present system utilizes motion information to predict the ambient lighting effect. Whereas the prior embodiments use the average color of the video content either on a macro-block or sub-block level, this embodiment utilizes the motion information together with the color of the content to predict the color that is utilized to control adjacent ambient lighting elements. In other words, content, such as video content that is not present (e.g., not displayed on a display device) is generated from the known content and used to control the ambient lighting effect. This has an effect of extending the actual video content outside the display screen.

In this embodiment, the motion information and average color on a sub-block scale may be calculated in the same way as described above on a sub-block level. Thereafter, the color of ambient lighting elements bordering the macro-block may be set in accordance with this embodiment. In a case wherein all sub-blocks next to the border between the adjacent ambient lighting element and the macro-block have a motion vector component perpendicular to this border that is equal to zero, the color of the adjacent ambient lighting element(s) may be set equal to the average color of these sub-blocks. In a similar embodiment, the average color of all sub-blocks within the macro-block that have a motion vector component present perpendicular to this border that is equal to zero may be utilized to set the color of the adjacent ambient lighting element(s). In these embodiments, moving objects that are not directly next to the border are ignored and the ambient lighting effect of the adjacent ambient lighting element(s) is controlled by the static background. In these embodiments, similar as other embodiments, the term static is intended with regard to motion relative to the relevant border.

In a case wherein all sub-blocks next to the border between the adjacent ambient lighting element(s) and the macro-block have a motion vector component present perpendicular to this border, as a first option, the color of the adjacent ambient lighting element(s) may be set equal to the average color of these sub-blocks, or similar as above, set equal to the average color of all sub-blocks within the macro-block that have motion relative to the relevant border. In this case, the static background is ignored. Lastly, in a case wherein only some sub-blocks next to the border between the adjacent ambient lighting element(s) and the macro-block have a motion vector component present perpendicular to this border, the color of the adjacent ambient lighting element may be set equal to the average color of these sub-blocks, or the average color of all sub-blocks within the macro-block that have a motion vector component present perpendicular to this border.

In a further embodiment as a second option similar to the first option, the color of the adjacent ambient lighting element(s) may be calculated using relative weights that are greater than one for the moving sub-blocks as compared to the non-moving sub-blocks that are given a relative weight of one. The first option may result in displacement in the ambient lighting effect in the region adjacent to moving objects present in the content. The second option smoothes this displacement effect but also reduces the apparent effect of the motion adaptive ambient lighting.

As an example, using the second option in case of partial motion within a macro-block and a relative weight of 1.5, the ambient lighting effect results in more contrast between the ambient lighting effects of successive frames as compared to prior embodiments. Accordingly, movement is emphasized even more, especially because a moving object only influences the ambient lighting effect when it is actually directly next to the border adjacent to the ambient lighting element.

In accordance with a further embodiment that utilizes sub-blocks adjacent to the frame border to determine the ambient lighting effect, a further advantage may be derived when one or more frame buffers are available for the content or one or more buffers are available for storing desired ambient lighting effects. For example, utilizing a frame buffer, a current frame may be used to predict the ambient lighting effect for a next or previous frame instead of the current frame. This will further emphasize movement in that in this embodiment, the motion of objects depicted in a frame will continue on the wall beyond the frame or originate on the wall prior to the frame as a result of the effect on the adjacent ambient lighting element(s). In this embodiment, the motion information of a sub-block may be used to predict the position of this sub-block in a next or previous frame. For example, when a position of a moving object proceeds beyond the border in a next frame, the color of an adjacent ambient lighting element may be controlled similar as above, but utilizing the derived color of the previous frame.

Figure 3A:
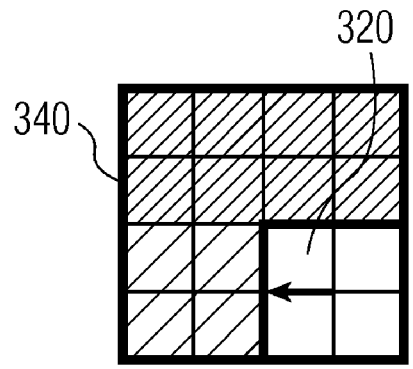
FIGS. 3A, 3B, 3C show an expanded view of a macro-block according to a further illustrative embodiment of the present system.
Figure 3B:
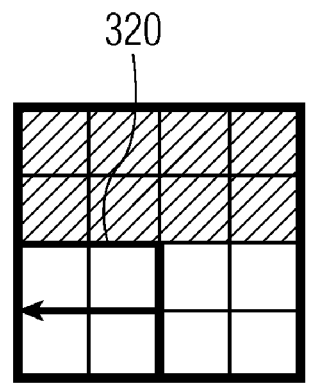
Figure 3C:
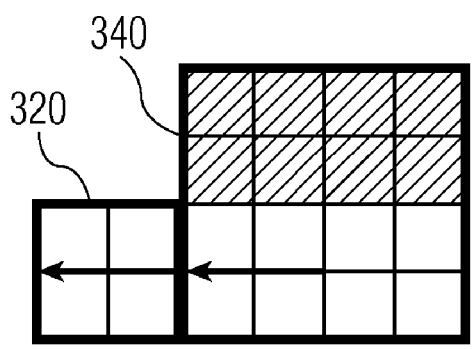

In this embodiment, the ambient lighting effect of a current frame may be controlled by a previous frame. For example, in FIG. 3, the box 320 represents a portion of an object (e.g., a sub-block) depicted within a frame that is bounded by a frame edge 340. The box 320 moves only 2 pixels to the left per frame (e.g., from FIG. 3A to FIG. 3B to FIG. 3C corresponding to a portion of corresponding frames 1, 2, 3). So in accordance with this embodiment of the present system, the moving sub-block of the macro-block is not positioned to effect an adjacent ambient lighting element in either of FIGS. 3A, 3B. Accordingly, the macro-block is not included in the calculation of the color of the adjacent ambient lighting elements for either of FIGS. 3A, 3B. However, for FIG. 3C (e.g., frame 3), the motion information of frame 2 shown in FIG. 3B is used. Since the box 320 is moving to the left at a rate of 2 pixels per frame, the box 320 if continued into frame 3, would be positioned outside the screen as shown in FIG. 3C. This places the box 320 within the position of the adjacent ambient lighting element(s) so it is included in the calculation of the color of the adjacent ambient lighting element(s) for FIG. 3 as shown. In this example, no frame buffer is required. The setting for the adjacent ambient lighting effect need only be delayed one frame (the current frame is used to calculate the ambient lighting effect of the next frame. Similarly, if the box 320 is moving to the right, the situation is reversed and the next frame is used to calculate the ambient lighting effect of the current frame.

In further embodiments wherein more frame buffers and/or more ambient lighting effect buffers are available, and multiple ambient lighting sources are present, a more emphasized motion effect may be accomplished. When multiple ambient lighting sources are available, such as sources behind loudspeakers, under chairs, etc., in succession progressively beyond the displays ambient lighting elements, this embodiment may be utilized to extend the perceived continuation of a object well beyond an edge of the display.

In accordance with the present system, motion that crosses the borders of the display device is emphasized thereby making the video content appear to be extended on the wall. In this way, moving objects appear to continue movement outside the screen in all directions thereby, resulting in a more immersive viewing experience.

Figure 4:
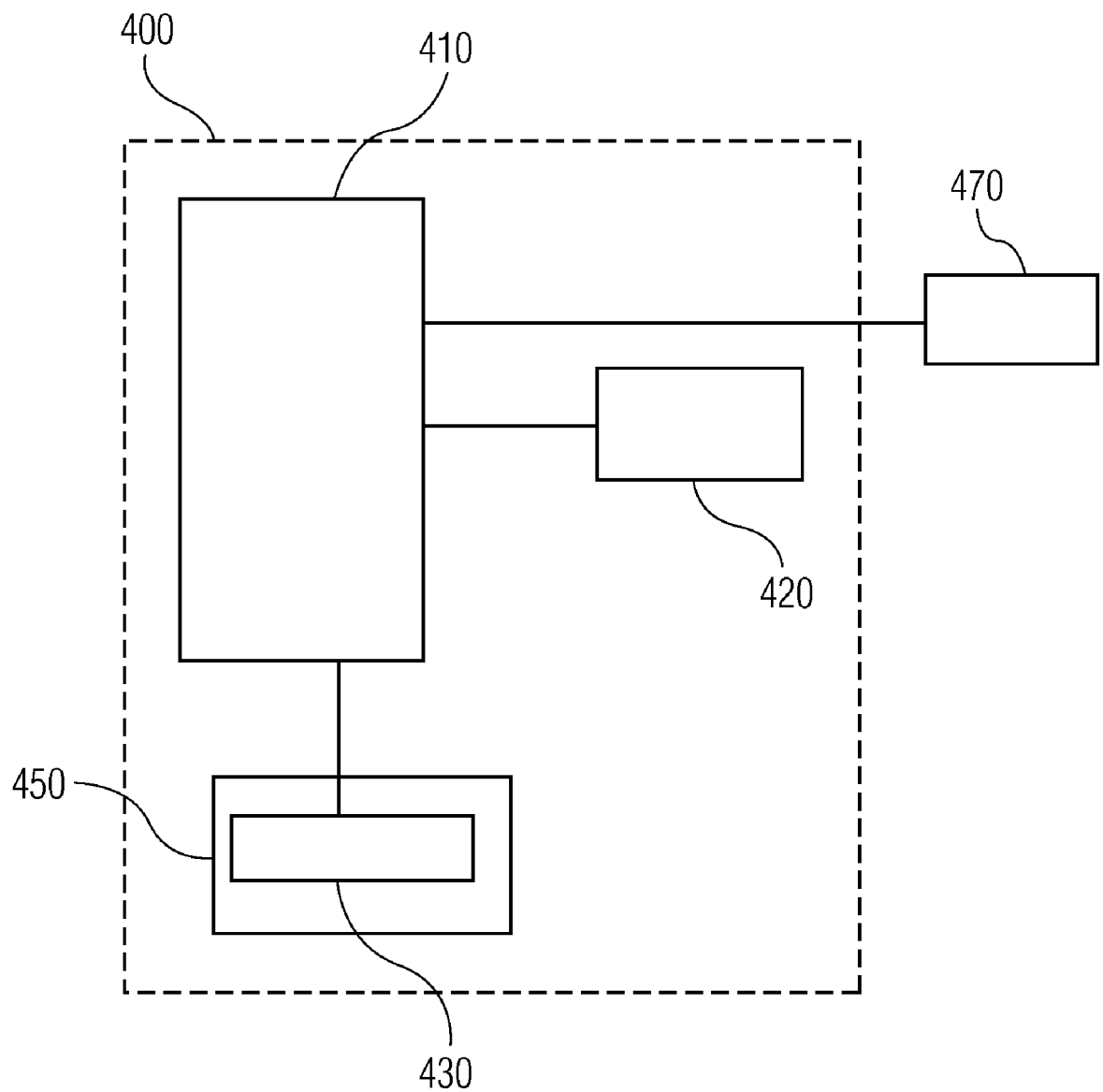
FIG. 4 shows a device in accordance with an embodiment of the present system.

FIG. 4 shows a device 400 in accordance with an embodiment of the present system. The device has a processor 410 operationally coupled to a memory 420, a display 430, ambient lighting elements 450, and an input/output (I/O) device 470. The memory 420 may be any type of device for storing application data as well as other data, such as motion information. The application data and other data, such as motion information, are received by the processor 410 for configuring the processor 410 to perform operation acts in accordance with the present system. The operation acts include controlling at least one of the display 430 to display content and controlling the ambient lighting elements 450 to display ambient lighting effects in accordance with the present system. The input/output 470 may include a keyboard, mouse, or other devices, including touch sensitive displays, which may be stand alone or be a part of a system, such as part of a personal computer, personal digital assistant, and display device such as a television, for communicating with the processor via any type of link, such as wired or wireless link. Clearly the processor 410, memory 420, display 430, ambient lighting elements 450, and/or I/O device 470 may all or partly be a portion of a television platform, such as a stand-alone television.

The methods of the present system are particularly suited to be carried out by a computer software program, such computer software program preferably containing modules corresponding to the individual steps or acts of the methods. Such software may of course be embodied in a computer-readable medium, such as an integrated chip, a peripheral device or memory, such as the memory 420 or other memory coupled to the processor 410.

The computer-readable medium and/or memory 420 may be any recordable medium (e.g., RAM, ROM, removable memory, CD-ROM, hard drives, DVD, floppy disks or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used as the computer-readable medium and/or memory 420.

Additional memories may also be used. The computer-readable medium, the memory 420, and/or any other memories may be long-term, short-term, or a combination of long-term and short-term memories. These memories configure processor 410 to implement the methods, operational acts, and functions disclosed herein. The memories may be distributed or local and the processor 410, where additional processors may be provided, may also be distributed, as for example based within the ambient lighting elements, or may be singular. The memories may be implemented as electrical, magnetic or optical memory, or any combination of these or other types of storage devices. Moreover, the term "memory" should be construed broadly enough to encompass any information able to be read from or written to an address in the addressable space accessed by a processor. With this definition, information on a network is still within memory 420, for instance, because the processor 410 may retrieve the information from the network for operation in accordance with the present system.

The processor 410 and memory 420 may be any type of processor/controller and memory, such as those described in U.S. 2003/0057887, which is incorporated herein by reference as if set out in entirety herein. The processor 410 is capable of providing control signals and/or performing operations in response to input signals from the I/O device 470 and executing instruction stored in the memory 420. The processor 410 may be an application-specific or general-use integrated circuit(s). Further, the processor 410 may be a dedicated processor for performing in accordance with the present system or may be a general-purpose processor wherein only one of many functions operates for performing in accordance with the present system. The processor 410 may operate utilizing a program portion, multiple program segments, or may be a hardware device utilizing a dedicated or multi-purpose integrated circuit.

Of course, it is to be appreciated that any one of the above embodiments or processes may be combined with one or with one or more other embodiments or processes to provide even further improvements in accordance with the present system.

Finally, the above-discussion is intended to be merely illustrative of the present system and should not be construed as limiting the appended claims to any particular embodiment or group of embodiments. Thus, while the present system has been described in particular detail with reference to specific exemplary embodiments thereof, it should also be appreciated that numerous modifications and alternative embodiments may be devised by those having ordinary skill in the art without departing from the broader and intended spirit and scope of the present system as set forth in the claims that follow. For example, while in the illustrative discussion, only motion of objects perpendicular to the frame border is utilized to adapt ambient lighting effects, clearly this is not required by the present system since a motion vector that is not resolved into perpendicular and parallel components may be utilized directly to continue an apparent direction of an object departing from the screen border directly in the departing direction (e.g., offset from a direction perpendicular to the screen border) as long as ambient lighting elements are present in this departing direction. In addition sizes of analyzed macro-blocks and sub-blocks are also intended to be merely illustrative and not limiting. Further, temporal frames of content may be utilized wherein an immediately preceding frame may adjust am ambient lighting effect of an immediately proceeding frame or a later proceeding frame as determined by a desired ambient lighting effect or as determined by the magnitude of the motion vector that is utilized to adjust the ambient lighting effect. Further modifications are intended within the scope of the present system. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise; and h) no specific sequence of acts or steps is intended to be required unless specifically indicated.

What is claimed is:

1. A method of controlling an ambient lighting element, the method comprising acts of:
   receiving a content signal;
   analyzing the content signal to determine a motion vector of an object depicted in the content signal;
   presenting the content signal on a display device;
   adjusting an ambient lighting effect provided by the ambient lighting element, the adjusting determined by the motion vector, wherein analyzing the content comprises the act of analyzing a portion of the content signal that is depicted positioned in proximity to an outside edge of the display device.

2. The method of claim 1, wherein analyzing the content comprises acts of:
   portioning the presented content signal into macro-blocks; and analyzing a macro-block depicted in proximity to the outside edge to determine the motion vector.

3. The method of claim 1, wherein analyzing the content signal comprises an act of resolving the motion vector into components that are parallel and perpendicular to the outside edge, wherein adjusting the ambient lighting effect comprises the act of adjusting the ambient lighting effect determined by the perpendicular component of the motion vector.

4. The method of claim 1, wherein the motion vector is determined from motion adaptive de-interlacing of the content signal.

5. The method of claim 1, wherein at least one of a luminance, color, saturation, and hue of the ambient lighting effect is adjusted by the motion vector.

6. The method of claim 1, wherein analyzing the content signal comprises acts of:
portioning the presented content signal into macro-blocks and sub-blocks;
determining an average color of each sub-block;
determining a motion vector of each sub-block;
weighting the determined average color of each sub-block by the corresponding motion vector; and
determining an average color of a macro-block by the weighted determined average color of corresponding sub-blocks, wherein the ambient lighting effect is determined by the determined average color of the macro-block.

7. The method of claim 6, wherein the weighting of the determined average color of each sub-block is given a weighting less than one for all sub-blocks having a non-zero motion vector.

8. The method of claim 1, wherein analyzing the content signal comprises acts of:
portioning the presented content signal into macro-blocks and sub-blocks;
determining a motion vector of each sub-block;
resolving the determined motion vectors into components that are parallel and perpendicular to the outside edge; and
determining a color characteristic of each sub-block depicted in proximity to the outside edge that has perpendicular motion vector components that are zero, wherein adjusting the ambient lighting effect comprises the act of determining the ambient lighting effect by the determined color characteristic.

9. The method of claim 1, wherein analyzing the content signal comprises acts of:
portioning the presented content signal into macro-blocks and sub-blocks;
determining a motion vector of each sub-block;
resolving the determined motion vectors into components that are parallel and perpendicular to the outside edge; and
determining a color characteristic of each sub-block depicted in proximity to the outside edge that has perpendicular motion vector components that are non-zero, wherein adjusting the ambient lighting effect comprises the act of determining the ambient lighting effect by the determined color characteristic.

10. A method of controlling an ambient lighting element, the method comprising acts of:
receiving a content signal;
analyzing the content signal to determine a motion vector of an object depicted in the content signal;
presenting the content signal on a display device;
adjusting an ambient lighting effect provided by the ambient lighting element, the adjusting determined by the motion vector, wherein the content signal is provided by temporal content portions and a first temporal content portion adjusts the ambient lighting effect provided during a second temporal content portion.

11. A device for controlling an ambient lighting element, the device comprising:
a memory; and
a processor operationally coupled to the memory, wherein the processor is configured to:
analyze a portion of a content signal that is positioned in proximity to an outside edge of a frame of the content signal to determine a motion vector of an object depicted in the content signal;
adjust an ambient lighting effect as determined by the motion vector.

12. The device of claim 11, wherein the processor is configured to:
divide the content signal into macro-blocks; and
analyze a macro-block positioned in proximity to the outside edge to determine the motion vector.

13. The device of claim 11, wherein the processor is configured to analyze temporal portions of the content signal and to adjust the ambient lighting effect produced during a first temporal portion of the content signal utilizing a motion vector determined from a second temporal portion of the content signal.

14. The device of claim 11, wherein the processor is configured to:
divide the content signal into macro-blocks and sub-blocks;
determine a motion vector and an average color of each sub-block contained within a macro-block in proximity to the outside edge;
weight the determined average color of each sub-block by the corresponding motion vector;
determine an average color of the macro-block by the weighted determined average color of the sub-blocks; and
adjust the ambient lighting effect by the determined average color of the macro-block.

* * * * *